(12) United States Patent
Kumada et al.

(10) Patent No.: US 9,640,812 B2
(45) Date of Patent: May 2, 2017

(54) FUEL CELL SYSTEM INCLUDING CONTROLLER TO PREVENT OVER-DISCHARGE OF BATTERY AND LOWERING IN DRIVABILITY UPON RECOVERING FROM IDLE STOP

(75) Inventors: Mitsunori Kumada, Yokosuka (JP); Shinichi Makino, Vancouver (CA); Yoshitomo Asai, Stuttgart (DE)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 100 days.

(21) Appl. No.: 14/118,024

(22) PCT Filed: Apr. 5, 2012

(86) PCT No.: PCT/JP2012/059367
§ 371 (c)(1),
(2), (4) Date: Nov. 15, 2013

(87) PCT Pub. No.: WO2012/157361
PCT Pub. Date: Nov. 22, 2012

(65) Prior Publication Data
US 2014/0087285 A1  Mar. 27, 2014

(30) Foreign Application Priority Data
May 18, 2011 (JP) .................. 2011-111267

(51) Int. Cl.
*H01M 8/02* (2016.01)
*H01M 8/04* (2016.01)
(Continued)

(52) U.S. Cl.
CPC ......... *H01M 8/04223* (2013.01); *B60L 1/003* (2013.01); *B60L 11/1803* (2013.01);
(Continued)

(58) Field of Classification Search
CPC ........... H01M 8/04223; H01M 8/0488; H01M 8/04753; H01M 8/04619; B60L 11/1887;
(Continued)

(56) References Cited

U.S. PATENT DOCUMENTS

2006/0003205 A1  1/2006  Yoshida et al.
2006/0257698 A1  11/2006  Ishikawa et al.
(Continued)

FOREIGN PATENT DOCUMENTS

CN  1832872 A  9/2006
CN  101473481 A  7/2009
(Continued)

OTHER PUBLICATIONS

Kastrup et al., Machine translation of WO 2004/006366 A1, Jan. 2004.*
European Search Report, Dec. 1, 2014, 6 pages.

*Primary Examiner* — Sean P Cullen
(74) *Attorney, Agent, or Firm* — Foley & Lardner LLP

(57) ABSTRACT

The fuel cell system of the present invention comprises: an electric motor, a fuel cell stack, a fuel supply unit, and a controller that controls a power-plant including the fuel cell stack and the fuel supply unit. The controller comprises further: a stack output-response request computing unit to compute a stack output-response request requested for the fuel cell stack; a stack voltage setup unit during idle-stop to set up a lower limit of stack setup-voltage during idle-stop that is set up as a stack voltage during execution of idle-stop so as to be higher as the stack output-response request is larger, and so as to be lower as the request is smaller; and an operation unit of recovering a stack voltage during idle-stop to execute a recovery operation when an actual stack voltage becomes, during execution of idle-stop, lower than the lower limit of stack setup-voltage during idle-stop.

7 Claims, 19 Drawing Sheets

(51) Int. Cl.
*H01M 8/06* (2016.01)
*B60L 11/18* (2006.01)
*H01M 8/04223* (2016.01)
*H01M 8/04537* (2016.01)
*H01M 8/04858* (2016.01)
*H01M 16/00* (2006.01)
*H01M 8/04746* (2016.01)
*B60L 1/00* (2006.01)
*H01M 8/0432* (2016.01)
*H01M 8/0438* (2016.01)

(52) U.S. Cl.
CPC ....... B60L 11/1857 (2013.01); B60L 11/1859 (2013.01); B60L 11/1861 (2013.01); B60L 11/1887 (2013.01); B60L 11/1892 (2013.01); H01M 8/0488 (2013.01); H01M 8/04619 (2013.01); H01M 8/04753 (2013.01); H01M 16/006 (2013.01); *B60L 2240/12* (2013.01); *B60L 2240/36* (2013.01); *B60L 2240/423* (2013.01); *B60L 2240/545* (2013.01); *B60L 2240/547* (2013.01); *B60L 2240/549* (2013.01); *B60L 2270/142* (2013.01); *B60L 2270/145* (2013.01); *H01M 8/0438* (2013.01); *H01M 8/04358* (2013.01); *H01M 2250/20* (2013.01); *Y02T 10/642* (2013.01); *Y02T 10/705* (2013.01); *Y02T 10/7044* (2013.01); *Y02T 90/32* (2013.01); *Y02T 90/34* (2013.01)

(58) Field of Classification Search
CPC .............. B60L 11/1803; B60L 11/1857; B60L 11/1859; B60L 11/1861; B60L 11/1892
USPC ......................................................... 429/444
See application file for complete search history.

(56) References Cited

U.S. PATENT DOCUMENTS

| 2008/0176117 | A1 | 7/2008 | Koike | |
|---|---|---|---|---|
| 2009/0169937 | A1 | 7/2009 | Umayahara | |
| 2010/0055521 | A1* | 3/2010 | Umayahara | H01M 8/04619 429/429 |
| 2010/0203409 | A1* | 8/2010 | Manabe | H01M 8/04268 429/431 |

FOREIGN PATENT DOCUMENTS

| DE | 102 30 783 A1 | 1/2004 |
|---|---|---|
| JP | 2005-71797 A | 3/2005 |
| JP | 2006-333602 A | 12/2006 |
| JP | 2008-52937 A | 3/2008 |
| JP | 4182732 B2 | 11/2008 |
| WO | WO 2004006366 A2 * | 1/2004 |

* cited by examiner

FUEL CELL SYSTEM INCLUDING CONTROLLER TO PREVENT OVER-DISCHARGE OF BATTERY AND LOWERING IN DRIVABILITY UPON RECOVERING FROM IDLE STOP

TECHNICAL FIELD

The present invention relates to stack voltage control during idle-stop of a fuel cell system.

BACKGROUND ART

In a vehicle or the like which runs with electric power generated by a fuel cell system, electric power generation by the fuel cell is stopped under a running condition of relatively low load or the like. That is, so-called idle-stop is executed in some cases. During idle-stop, air supply to a cathode is stopped. Oxygen that remains in the cathode is consumed by reacting with hydrogen that permeates to the cathode, whereby a stack total-voltage gradually lowers.

Idle-stop is terminated when a charged amount of batteries lowers below a predetermined threshold value or when load is increased by speed-up request or the like. However, it requires time from an instant when fuel supply is re-started to an instant when current is ready to be taken out. In addition, because of electric motor characters, even with the same accelerator operations, a response performance of electric power required upon acceleration becomes higher as vehicle speed increases. Then, a battery's dischargeable electric power is determined by the battery's state of charge, temperature, deterioration state, and the like.

Accordingly, if an electric motor for driving is driven by an output according to a magnitude of acceleration request upon recovery from idle-stop, an electric power that is not sufficiently provided with an electric power generated by the fuel cell would be supplied from the battery. As a result, over-discharge of the battery would occur. To the contrary, if the output of the electric motor is limited, drivability would be lowered.

Therefore, in JP4182732, when an increase in requested electric power is presumed, prior to recovery from idle-stop, supply of hydrogen or the air is re-started. Furthermore, also when the stack voltage lowers below a predetermined voltage during idle-stop, supply of hydrogen or the air is re-started. By way of these controls, delay of power generation on the recovery from idle-stop is avoided.

SUMMARY OF INVENTION

However, in the method of JP4182732, on the basis of up-hill detection or the like by way of shift operation, break-off, or a navigation system, an acceleration pedal is presumed to be used after this detection, whereby restarting fuel supply. Then, as described above, it requires time from re-start of fuel supply to voltage recovery of the stack. Consequently, depending on the magnitude of requested electric power, over-discharge of battery or lowering in drivability cannot be avoided in some cases.

An object of the present invention is, therefore, to provide a fuel cell system that is allowed to avoid without fail over-discharge of battery or lowering in drivability upon recovery from idle-stop.

In order to attain the above object, the fuel cell system of the present invention is provided with: a driving unit to run a mobile body by an electric power supply; a fuel cell stack that supplies an electric power to the driving unit; a fuel supply unit that supplies fuel for electric power generation to the fuel cell stack; and a controller that controls a power-plant including the fuel cell stack and the fuel supply unit. Then, the controller is provided with a stack output-response request computing unit, which computes a stack output-response request that is an electric power response requested for the fuel cell stack. In addition, a stack voltage setup unit during idle-stop is provided, wherein this unit sets up a lower limit of a stack setup-voltage during idle-stop, which is set up as a stack voltage during execution of idle-stop, higher as the stack output-response request is larger, and lower as the request is smaller. Furthermore, an operation unit of recovering the stack voltage during idle-stop is provided, wherein this unit executes a recovery operation of supplying fuel gas or the air when an actual voltage of the fuel cell stack during idle-stop becomes lower than the lower limit of the stack setup-voltage during idle-stop.

The details and other aspects or advantages of the present invention are described in the following description and are shown in the drawings accompanied therewith.

DESCRIPTION OF EMBODIMENTS

First Embodiment

Figure 1:
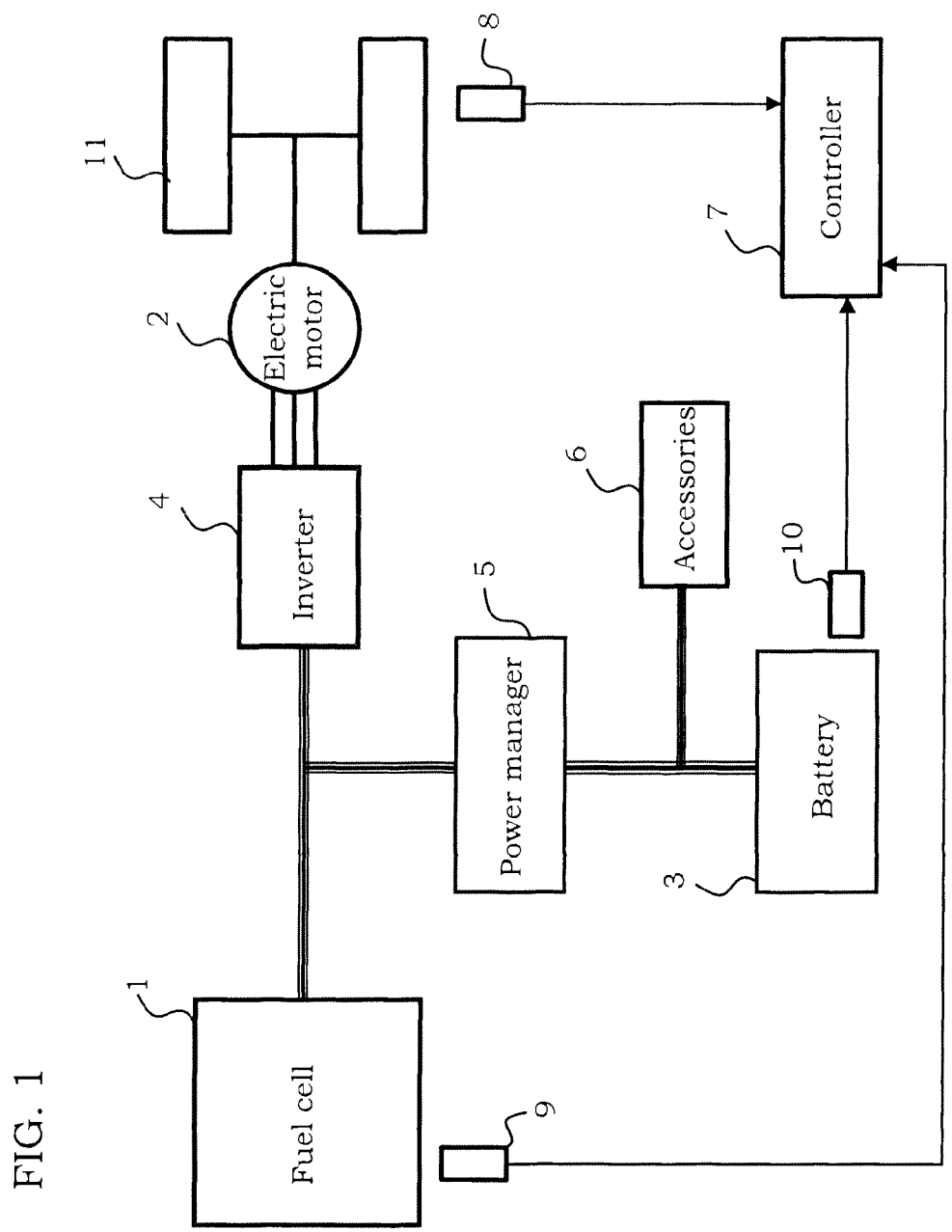
FIG. 1 is a block diagram illustrating an electric power supply system for vehicles to which a first embodiment is applied.
Figure 2:
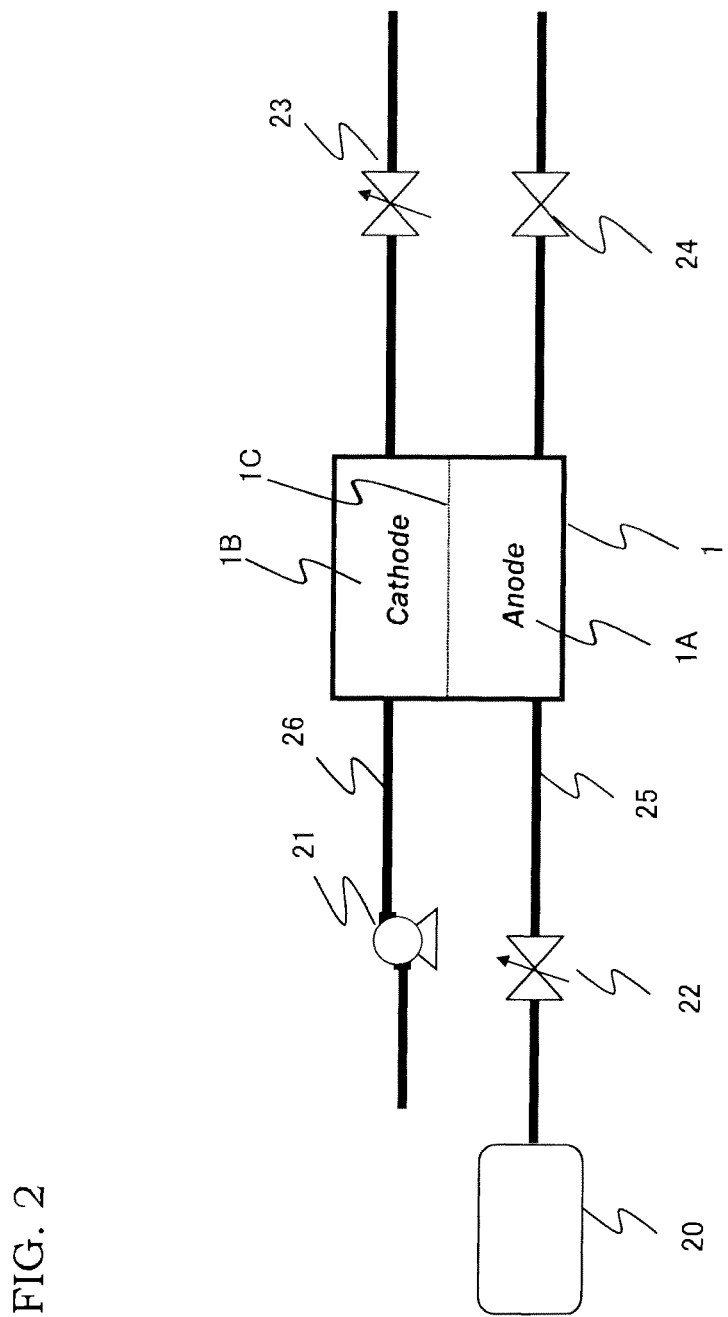
FIG. 2 is a diagram illustrating an example of a fuel cell system.

FIG. 1 is a block diagram illustrating an electric power supply system for vehicles, to which a first embodiment is applied. FIG. 2 is a diagram illustrating an example of a fuel cell system.

An electric power supply system comprises: a fuel cell stack 1; an electric motor 2 as a load; a battery 3; accessories 6; and a power manager 5 that controls a voltage among the fuel cell stack 1, the electric motor 2, the battery 3, and the accessories 6.

The fuel cell stack 1 is a direct-current power source, as is shown in FIG. 2, having a structure of piling-up a plurality of unit cells in which a electrolyte membrane 1C is sandwiched between an anode 1A and a cathode 1B. Note that, in FIG. 2, only a unit cell is shown.

To the anode 1A, through a hydrogen supply passage 25, hydrogen gas that serves as a fuel is supplied. To the cathode 1B, through an air supply passage 26, the air that serves as an oxidant gas is supplied.

In the hydrogen supply passage 25, a pressure regulating valve 22 is installed. With the valve, after being reduced to a predetermined pressure, high pressure hydrogen in a hydrogen tank 20 is supplied to the anode A1. Note that, only one pressure regulating valve 22 is described herein, but a plurality of the valves may be installed in series so as to reduce the pressure step by step. On the outlet side of the anode 1A, a purge valve 24 is provided so as to discharge fuel gas that is not consumed at the anode 1A.

The air is supplied, with a compressor 21, to the cathode 1B through the air supply passage 26. On the outlet side of the cathode 1B, a pressure regulating valve 23 is provided so as to regulate the pressure of the cathode.

The battery 3 is a direct-current power source, and is composed of a lithium ion battery, for example.

The electric motor 2 is connected with the fuel cell stack 1 and the battery 3 through an inverter 4, and drives wheels 11 with an electric power supplied from the fuel cell stack 1 or the battery 3.

The accessories 6 include, besides the compressor 21, electrical attachments such as wipers that are involved in running of vehicles, and instruments such as audio equipment, car navigation systems, and air conditioners.

The power manager 5 comprises a DC/DC converter. Then, the power manager 5 takes an electric power out of the fuel cell stack 1, and supplies this electric power to the electric motor 2 or to the battery 3. Note that, an electric power that is allowed to pass through the power manager 5 might be limited by overheating of internal elements and others in some cases. On this occasion, an electric power that is supplied from the fuel cell stack 1 or the battery 3 to the electric motor 2 and the accessories 6 is limited. Note that, in the following description, the fuel cell stack 1, the power manager 5, the compressor 21, and others are, as a whole, called as a power-plant, in some cases.

Each configuration of the above mentioned electric power supply system is controlled by a controller 7. Each of values detected by a vehicle speed sensor 8 (vehicle speed detecting device) that is configured to detect a vehicle speed, a stack voltage sensor 9 that is configured to detect the voltage of the fuel cell stack 1, and a battery sensor 10 that is configured to detect the charged electricity of the battery 3 is input into the controller 7. Note that, the controller 7 is constructed by a microcomputer that is equipped with a central processing unit (CPU), a read-only memory (ROM), a random-access memory (RAM), and an input and output interface (I/O interface). The controller 7 may be constructed by a plurality of microcomputers.

The controller 7, for example, when a requested electric power is low as in the case of low load running, drives the electric motor 2, the accessories 6, and others with only an electric power of the battery 3, while the electric power generation of the fuel cell stack 1 is stopped temporarily. Namely, so-called idle-stop is executed.

During idle-stop, air supply to the cathode is stopped, but the oxygen that remains in the cathode is consumed by reacting with hydrogen that permeates to the cathode, whereby the total stack voltage gradually lowers.

Idle-stop is terminated when the charged electricity of the battery lowers below a predetermined threshold value or when the requested electric power is increased by an acceleration request or the like. However, it requires time from the instant when the fuel cell stack 1 re-starts fuel supply to the instant when the state that a current is ready to be taken out is realized. In addition, even with the same accelerator operation, a response performance of electric power requested upon acceleration, that is, a requested response performance of stack electric power generation becomes higher as the vehicle speed is higher. On the other hand, a dischargeable electric power of the battery 3 is determined by state of charge, temperature, deterioration level, and others of the battery 3.

Accordingly, when the electric motor 2 that is used for driving is driven by an output power corresponding to a magnitude of the acceleration request upon recovery from idle-stop, an insufficient electric power generated by the fuel cell stack 1 is supplied from the battery 3, whereby possibly leading to over-discharge of the battery 3. To the contrary, if the output of the electric motor 2 is limited in order to prevent over-discharge of the battery 3 upon acceleration, lowering in drivability might be resulted.

Therefore, at the time of recovery from idle-stop, the controller 7 executes the following control routine in order to avoid over-discharge of the battery 3 or lowing in drivability.

Figure 3:
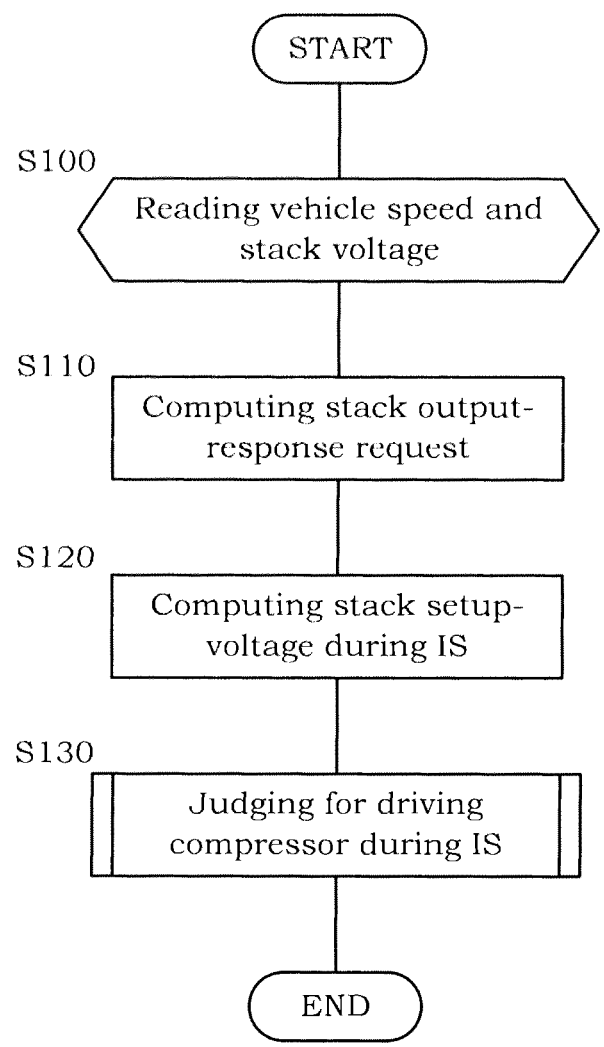
FIG. 3 is a flowchart showing a control routine according to a first embodiment executed by a controller.

FIG. 3 is a flowchart showing a control routine executed by a controller 7 during idle-stop. In this control routine, as the output-response performance required for the fuel cell stack 1 is higher upon recovery from idle-stop, the stack voltage lower limit of the fuel cell stack 1 during idle-stop is controlled at a higher value. Then, when the actual voltage becomes equal to or lower than the lower limit of stack voltage during idle-stop, the controller 7 supplies the air to the cathode 1B as a recovery operation. Hereinafter, details of the control routine are described in accordance with each step.

In a step of S100, the controller 7 reads a detected value of the vehicle speed sensor 8 and a detected value of the stack voltage sensor 9.

In a step of S110, the controller 7 (stack output-response request computing means) computes, based on the vehicle speed, a stack output-response request. The reason for using the vehicle speed is that a higher vehicle speed requests a higher stack output-response request when an accelerator pedaling level is the same.

Figure 4:
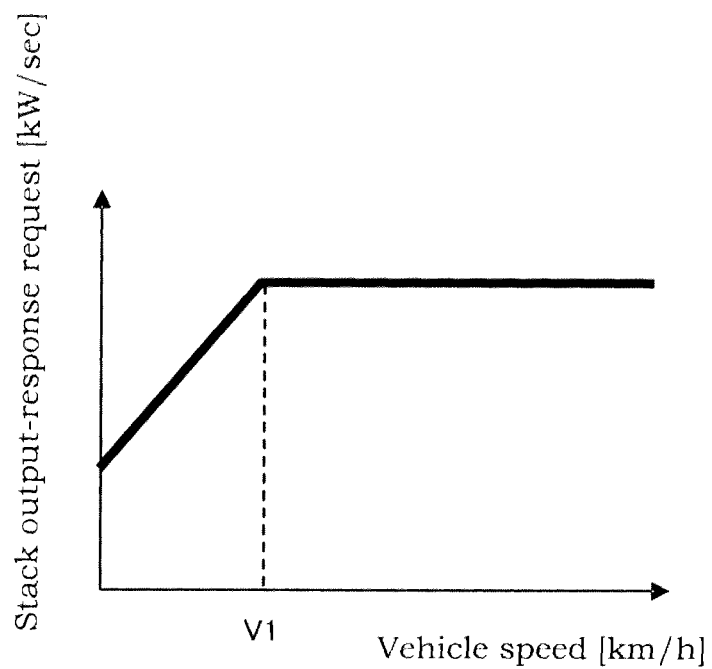
FIG. 4 is an example of a map showing a relation between vehicle speed and a stack output-response request.
Figure 5:
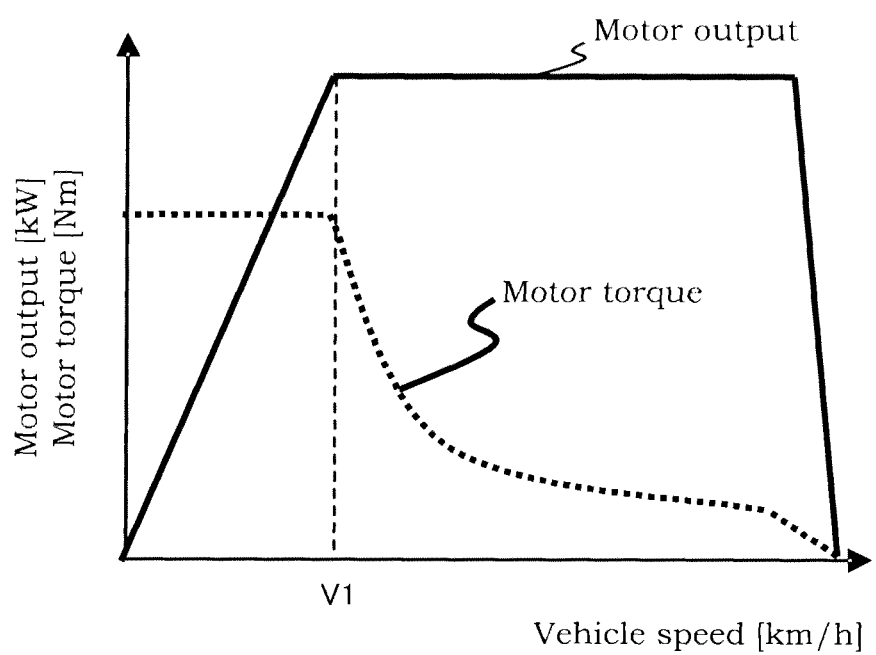
FIG. 5 is diagram illustrating relations between vehicle speed and each of motor torque and motor output.

Therefore, a map as shown in FIG. 4, which shows a relation between the vehicle speed and the stack output-response request, is preliminarily prepared, and the map is retrieved. In FIG. 4, the vertical axis shows the stack output-response request in kW/sec and the horizontal axis shows the vehicle speed in km/h. In a range of zero to V1 of the vehicle speed, the stack output-response request increases proportionally to the increase of the vehicle speed. When vehicle speed exceeds V1, the response request becomes a constant value. A vehicle speed of V1 is the one at which motor-torque begins to decrease and then reaches an upper limit in FIG. 5 that shows relations between vehicle speed and each of motor-torque and motor-output.

Figure 6:
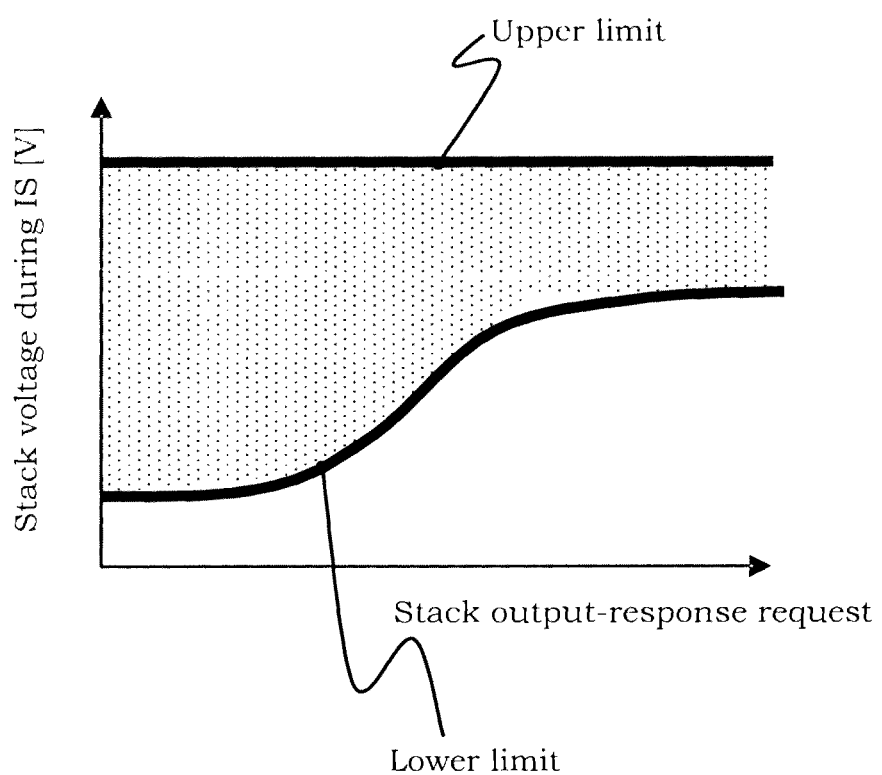
FIG. 6 is an example of a map illustrating a relation between stack voltage during idle-stop and a stack output-response request.

In a step of S120, the controller 7 (stack voltage setup means) computes, by using a map that is shown in FIG. 6, the lower limit of stack setup-voltage during idle-stop. In FIG. 6, the vertical axis shows the stack voltage in V during idle-stop and the horizontal axis shows the stack output-response request in kW/sec.

The lower limit of the stack voltage during idle-stop becomes larger as the stack output-response request is higher. However, the absolute value thereof changes depending on vehicle specifications such as an electric power that is required for driving the electric motor 2, the accessories 6, and the others. Note that, the upper limit of the stack voltage during idle-stop is the one that is allowed to avoid high-voltage deterioration. From the map described above, the upper limit and the lower limit of the stack voltage during idle-stop, which correspond to the stack output-response request that is computed in the step of S110, are obtained.

Figure 7:
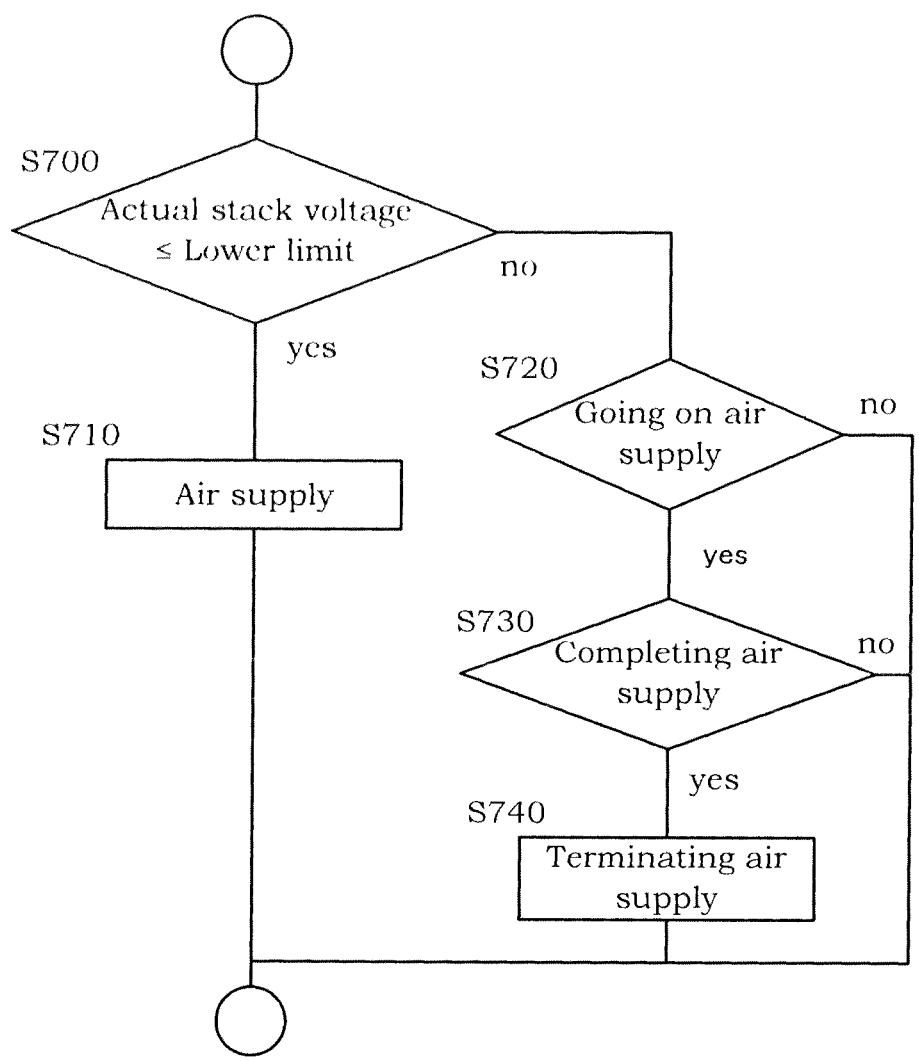
FIG. 7 is a flowchart showing a subroutine that is executed by a controller in order to make a judgment whether or not to drive a compressor.

In a step of S130, the controller 7 executes a subroutine shown in FIG. 7 in order to judge whether the compressor 21 is driven or not.

In a step of S700, the controller 7 judges whether the actual stack voltage is equal to or lower than the lower limit of the stack voltage during idle-stop, or not. In the case of equal to or lower than the lower limit, the processing of a step of S710 is executed. In the case of larger than the lower limit, the processing of a step of S720 is executed.

In the step of S710, the controller 7 drives the compressor 21 thereby supplying the air to the cathode 1B. By so doing, oxygen deficiency in the cathode 1B is resolved. Note that, the air is not necessarily supplied continuously, but may be supplied intermittently.

In the step of S720, the controller 7 judges whether the air is currently being supplied or not. When the air is being supplied, the processing of a step of S730 is executed. When the air is not being supplied, this subroutine is terminated.

In the step of S730, the controller 7 judges the timing of terminating air supply. The timing of terminating air supply is judged in a manner that a driving time of the compressor 21 and an amount of the air supplied to the cathode B1 are preliminarily set up and that the timing is judged when these preliminarily set up values are attained. Also, the timing of terminating air supply is judged when the actual stack voltage attains the upper limit.

When the timing of terminating air supply is reached, the processing of a step of S740 is executed. When not reached, this subroutine is terminated.

In the step of S740, the controller 7 stops the compressor 21 to terminate the air supply.

Actions and effects accompanied by executing the aforementioned control routine will be described.

Figure 8:
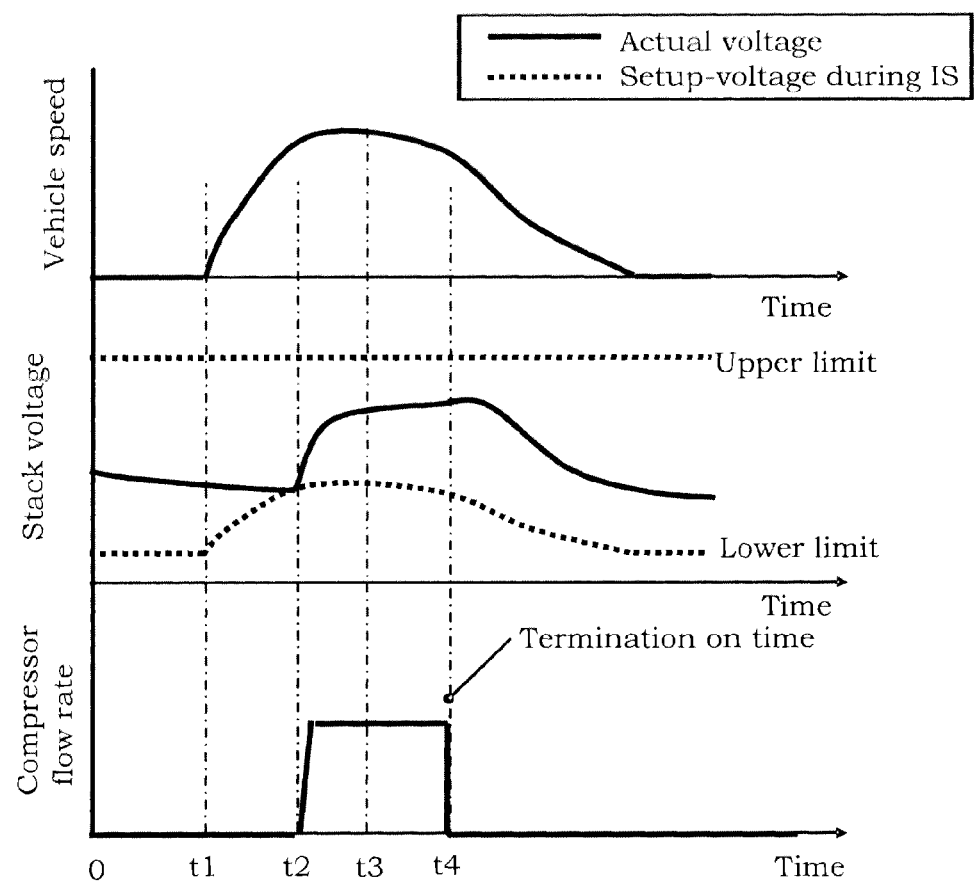
FIG. 8 is a time-chart of executing a control routine according to a first embodiment.

FIG. 8 shows a time-chart for the vehicle speed, the stack voltage, and the compressor flow rate when a control routine in FIG. 3 is executed during idle-stop. Note that, the compressor flow rate is an amount of air passing through the compressor 21.

Before a timing of t1, the vehicle speed is zero and constant. Therefore, the lower limit of the stack setup-voltage during idle-stop is constant. The actual stack voltage decreases with elapse of time, however, it is larger than the lower limit of the stack setup-voltage during idle-stop, so that the compressor 21 does not operate and the flow rate of the compressor is zero.

At the timing of t1, when the vehicle speed starts to increase, the lower limit of the stack setup-voltage during idle-stop also increases. Then, when the actual stack voltage coincides with the lower limit of the stack setup-voltage during idle-stop at a timing of t2, the compressor 21 starts to operate thereby leading to increase in the flow rate of the compressor. Consequently, the actual stack voltage increases and becomes larger than the lower limit of the stack setup-voltage during idle-stop.

After the timing of t2, when the vehicle speed starts to decrease, the lower limit of the stack setup-voltage during idle-stop also starts to decrease. The actual stack voltage continues to increase because the compressor 21 is under operation.

At a timing of t4, the compressor 21 stops because a predetermined operation time thereof has been elapsed. After that, the actual stack voltage also decreases as the amount of oxygen in the cathode 1B lowers.

In this way, the controller 7 sets up higher the lower limit of the stack setup-voltage during idle-stop as the vehicle speed during idle-stop is higher. Further, the controller 7 controls the actual stack voltage so as not to be lower than the lower limit of the stack setup-voltage during idle-stop. By so doing, the response performance of stack electric power generation upon recovery from idle-stop is secured.

In the meantime, if the lower limit of the stack setup-voltage during idle-stop is fixed at a value at the timing of t1, the actual stack voltage continues to decrease after the timing of t2. Therefore, the aforementioned over-discharge of the battery 3 and lowering in drivability cannot be avoided. On the other hand, if the lower limit of the stack setup-voltage during idle-stop is fixed at a value corresponding to a high-speed vehicle, like the values of the timing of t2 or a timing of t3, an operation frequency of the compressor 21 increases. This will lead to downturn of fuel consumption caused by increase in electric power consumption or deterioration in sound vibration performance.

To the contrary, in this control routine, the lower limit of the stack setup-voltage during idle-stop is set up in accordance with the vehicle speed, so that downturn of fuel consumption or deterioration in sound vibration performance can be avoided.

Note that, even before the operation time of the compressor 21 reaches the preliminarily determined time, when the actual stack voltage increases to the upper limit of the stack setup-voltage during idle-stop, the compressor 21 is stopped.

As described above, according to the first embodiment, the following effects are obtained.

The controller 7 operation means) computes the stack output-response request and sets the upper limit of the stack setup-voltage during idle-stop at the value so as to be able to avoid the high voltage deterioration and the lower limit so as to be higher as the stack output-response request is larger and so as to be lower as the request is smaller. Then, during execution of idle-stop, when the actual voltage of the fuel cell stack 1 becomes lower than the lower limit of the stack setup-voltage, recovery operation is executed. By so doing, when the stack output-response request is larger, that is, as the response performance requested for the fuel cell stack 1 is higher, the stack voltage upon recovering from idle-stop becomes higher. Consequently, the response performance of the stack electric power can be enhanced. In addition, the recovery operation is executed in accordance with the actual stack voltage, so that unnecessary operation of the accessories 6 and others can be suppressed. As a result, lowering in fuel consumption or sound vibration performance can be prevented.

The controller 7 computes a higher stack output-response request as the vehicle speed is higher. By so doing, a stack output-response request that reflects exactly a response performance requested for the fuel cell stack 1 can be computed.

Second Embodiment

The system construction of a second embodiment is basically similar to that of the first embodiment. However, a difference resides in the aspect how the controller 7 reads, as the state quantities of the battery 3, battery temperature and battery deterioration coefficient in addition to the charged electricity of the battery. The battery temperature is detected by a battery temperature sensor. The battery deterioration coefficient is computed by the controller 7. The battery deterioration coefficient is based on a battery property deterioration as the repeating number of charging increases; and this coefficient becomes larger as the deterioration advances. The battery deterioration coefficient is computed, for example, as following: the repeating number of charging is counted; and a preliminarily prepared map that provides a relation between the repeating number of charging and the level of deterioration is retrieved with the said counted number of charging. Of course, the other publicly known methods may be used.

Another difference from the first embodiment resides in the contents of computing the stack output-response request in the control routine that is executed by the controller 7 during idle-stop. In this embodiment, the stack output-response request is computed in accordance with the state quantities of the battery. In the case of acceleration in accordance with an acceleration pedaling level of a driver, an output requested for the electric motor 2, that is, a transient response performance, is set up in accordance with the acceleration pedaling level. In this case, even if an output requested for the electric motor 2 is the same, as the battery's dischargeable electric power is smaller, the transient response performance requested for the fuel cell stack 1 becomes larger. Therefore, the stack output-response request is computed in accordance with the state quantities of the battery.

Figure 9:
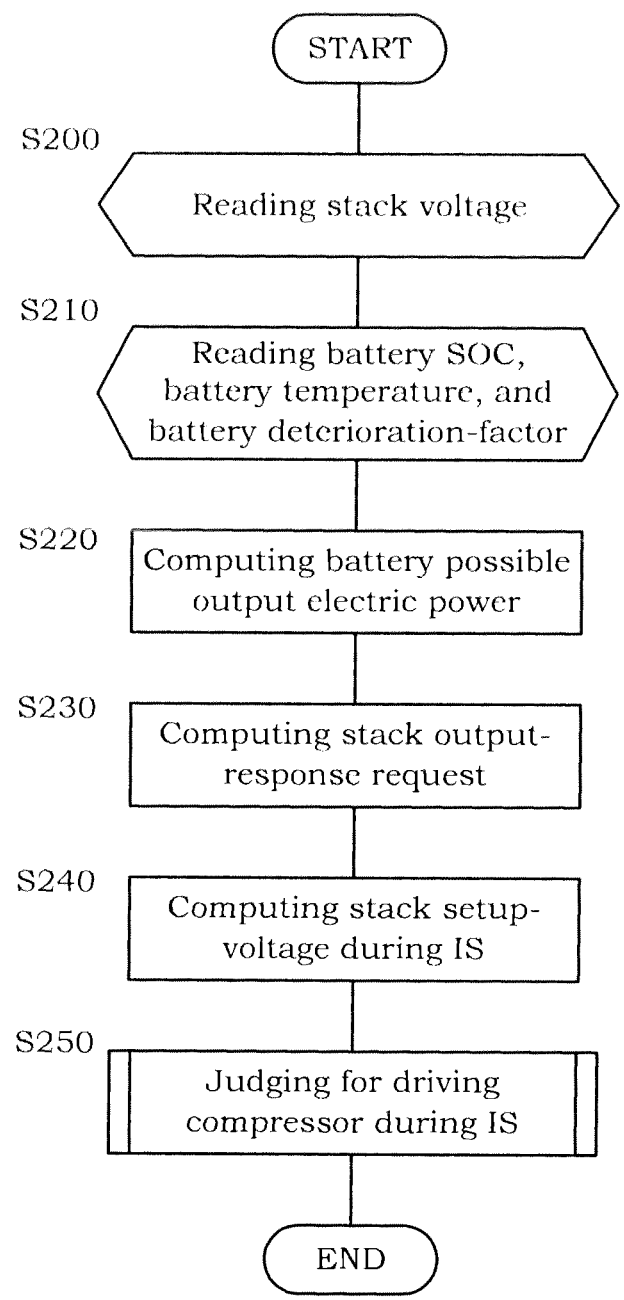
FIG. 9 is a flowchart showing a control routine executed by a controller according to a second embodiment.

FIG. 9 is a flowchart showing a control routine that is executed by the controller 7 during idle-stop. In the first embodiment, the stack output-response request is computed based on the vehicle speed; but, in a second embodiment, a difference resides in the aspect that the request is computed based on the battery's dischargeable electric power. In the following, explanation will be made in accordance with steps.

In a step of S200, the controller 7 reads the actual stack voltage.

In a step of S210, the controller 7 reads a battery's charged electricity, a battery temperature, and a battery deterioration efficiency.

Figure 10:
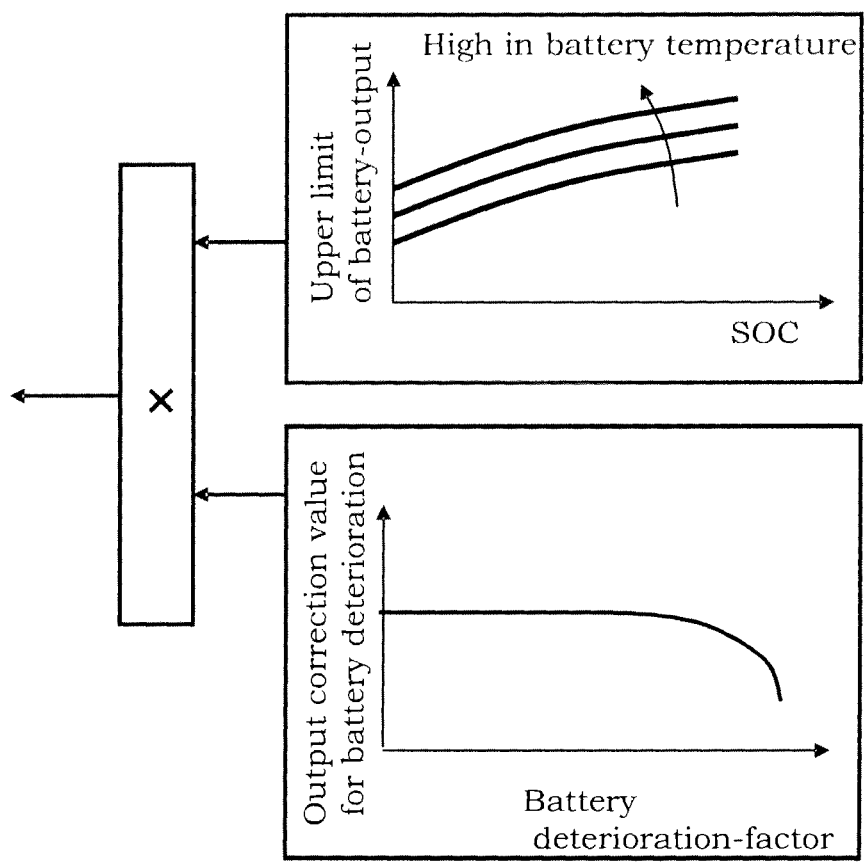
FIG. 10 is an example of a computation block for computing a battery's dischargeable electric power.

In a step of S220, the controller 7 (battery's dischargeable output electric power detecting device) computes a battery's dischargeable electric power. FIG. 10 illustrates an example of a computation block for calculating the battery's dischargeable electric power.

At first, by using the battery's charged electricity and the battery temperature, a battery output upper limit is obtained from the battery output upper limit map. As shown in FIG. 10, the battery output upper limit becomes higher as the battery's charged electricity is larger. In addition, in the case of the same battery's charged electricity, the battery output upper limit becomes higher as the battery temperature is higher.

Next, by using the battery deterioration coefficient, an output correction value for battery deterioration is obtained from an output correction value map for battery deterioration. As shown in FIG. 10, the output correction value for battery deterioration becomes smaller as the battery deterioration coefficient is larger.

Then, the battery output limit which is corrected with the output correction value for battery deterioration is regarded as a battery's dischargeable electric power.

Figure 11:
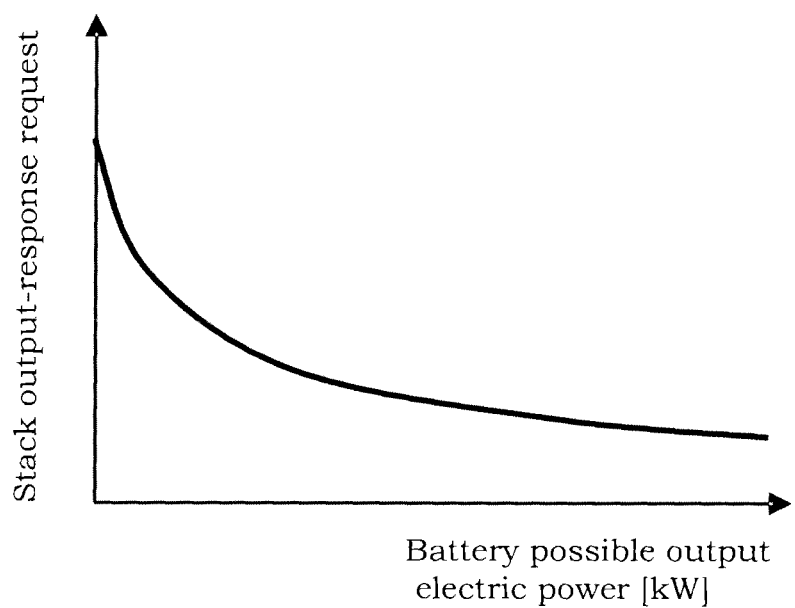
FIG. 11 is an example of a map illustrating a relation between a stack output-response request and a battery's dischargeable electric power.

In a step of S230, the controller 7 computes the stack output-response request. Here, as shown in FIG. 11, a map that shows a relation between the stack output-response request and the battery's dischargeable electric power is used. As shown in FIG. 11, the stack output-response request becomes lower as the battery's dischargeable electric power is larger. This is because when the battery's dischargeable electric power is larger, an electric power required for acceleration can be covered by an electric power supplied by the battery 3.

Each of a step of S240 and a step of S250 is a processing substantially similar to the step of S120 and the step of S130 in FIG. 3 respectively, so that the explanations thereof are omitted.

Figure 12:
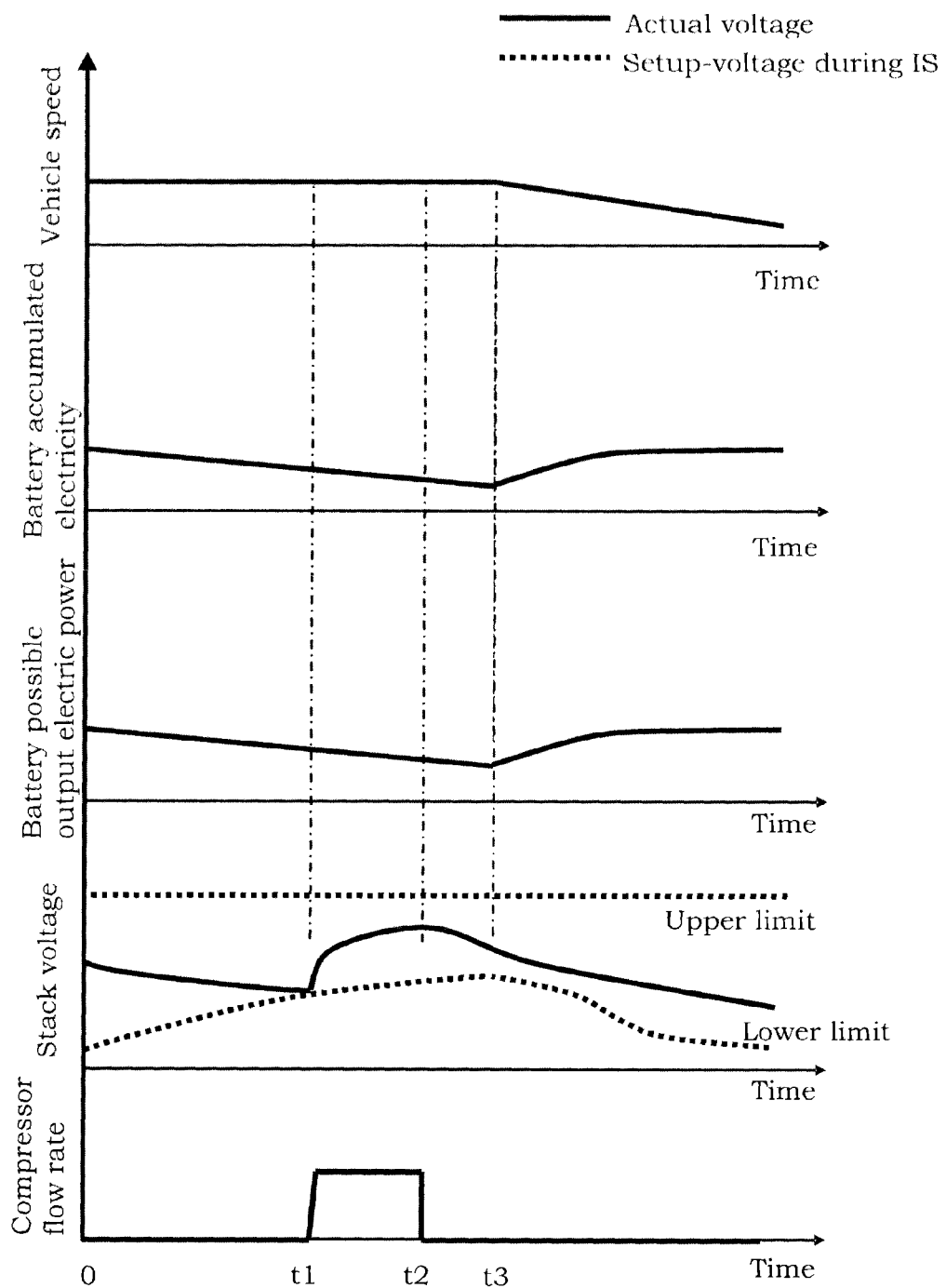
FIG. 12 is a time-chart of executing a control routine according to a second embodiment.

FIG. 12 is a time-chart of vehicle speed, battery's charged electricity, battery's dischargeable electric power, stack voltage, and compressor flow rate in the case of executing this control routine during idle-stop. The vehicle speed is constant until the timing of t3 and lowers from the timing of t3.

As an execution time of idle-stop elapsed, the battery's charged electricity lowers. Along with this, the battery's dischargeable electric power also lowers. Further, along with lowering in the battery's dischargeable electric power, the lower limit of the stack setup-voltage during idle-stop increases.

In addition, the actual stack voltage also lowers as the execution time of idle-stop elapsed. At the timing of t1 when the actual stack voltage lowers to the lower limit of the stack setup-voltage during idle-stop, and then the compressor 21 starts to operate and the actual stack voltage turns to increase. The compressor 21 stops at the timing of t2 because the preliminarily setup operation time has elapsed.

Even during the timing of t1 to the timing of t3, the battery's charged electricity continues to decrease. Along with this, the battery's dischargeable electric power continues to decrease and, the lower limit of the stack setup-voltage continues to increase.

After the timing of t3, when the vehicle speed starts to decrease, the battery's charged electricity turns to be increased by electric power regeneration. Consequently, the battery's dischargeable electric power starts to increase, so that the lower limit of the stack setup-voltage during idle-stop starts to decrease. Accordingly, while the actual stack voltage continues to decrease after the compressor 21 has stopped, the compressor 21 does not restart.

In this way, as the battery's dischargeable electric power is lower, also by controlling higher the lower limit of the stack setup-voltage during idle-stop, similarly to the first embodiment, the response performance of the stack electric power generation upon recovery from idle-stop can be secured, so that over-discharge of the battery 3 and lowering in drivability can be prevented actually.

Note that, in the above explanation, the battery's dischargeable electric power is computed by using three factors, the battery's charged electricity, the battery temperature, and the battery deterioration information. However, the computation may be performed by using any one or two among these.

As explained above, according to the second embodiment, in addition to the same effects as the first embodiment, the following effects are further attained.

The controller 7 computes a higher stack output-response request as the battery's dischargeable electric power is lower. By so doing, a stack output-response response in accordance with a transient response performance requested for the power-plant can be set up.

Third Embodiment

The system construction of a third embodiment is basically similar to that of the first embodiment. However, a difference from the first embodiment resides in the computation contents of the stack output-response request computed by the controller 7. In this embodiment, the stack output-response request is computed in accordance with a constant of the power-plant that includes therein the fuel cell stack 1, the power manager 5 and the compressor 21. Note that, the controller 7 computes higher, similarly to the first embodiment and the second embodiment, the lower limit of the stack setup-voltage during idle-stop as the stack output-response request is higher. In addition, the constant at the time of the power-plant response is called as a power-plant output-response performance in the following explanation.

As the power-plant output-response performance lowers, a time, which is required until the output of the electric motor 2 attains a target output that is determined by the level of driver's accelerator operation, becomes longer. Therefore, as the power-plant output-response performance is lower, the controller 7 is made to compute a higher stack output-response request performance. By so doing, as the power-plant output-response performance is lower, the lower limit of the stack setup-voltage during idle-stop is set up higher. As a result, even the power-plant output-response performance lowers, the response performance of the electric motor 2 can be secured upon recovery from idle-stop.

Figure 14:
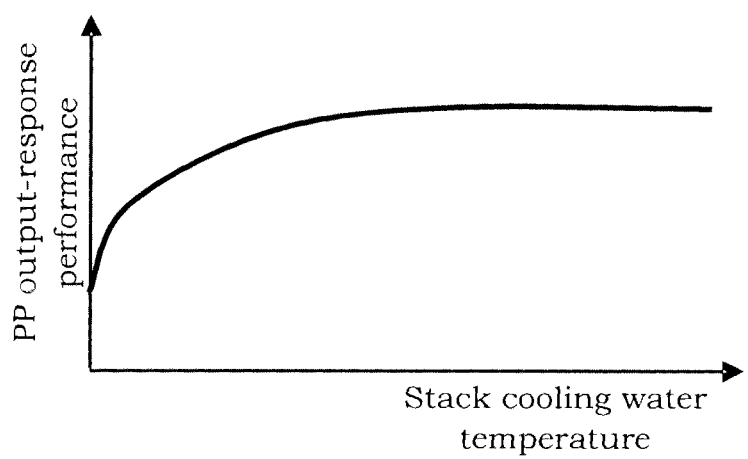
FIG. 14 is an example illustrating a relation between a power-plant output-response request performance and a stack coolant temperature.

Meanwhile, factors of lowering the power-plant output-response performance include a factor that is originated from the fuel cell stack 1 and a factor that is originated from the other than the fuel cell stack 1. The factor that is originated from the fuel cell stack 1 includes, firstly, the temperature of stack cooling water. As the temperature of stack cooling water lowers, the output-response performance of the fuel cell stack 1 lowers. Therefore, as shown in FIG. 14, as the temperature of the stack cooling water lowers, the power-plant output-response performance also lowers.

Figure 15:
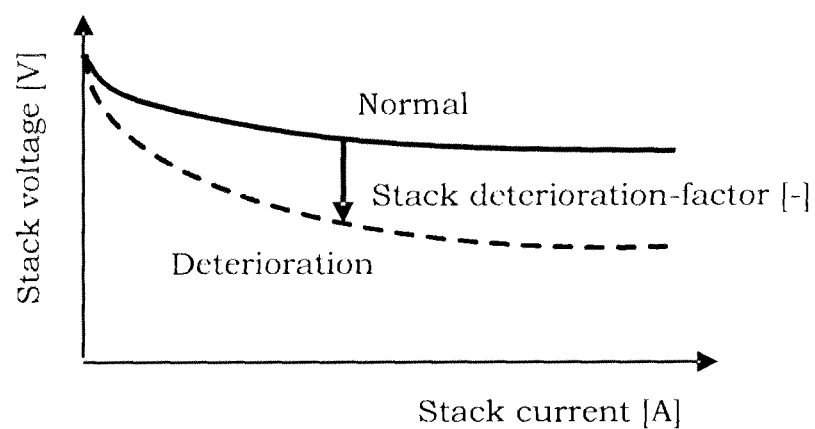
FIG. 15 is a diagram explaining a stack deterioration coefficient.
Figure 16:
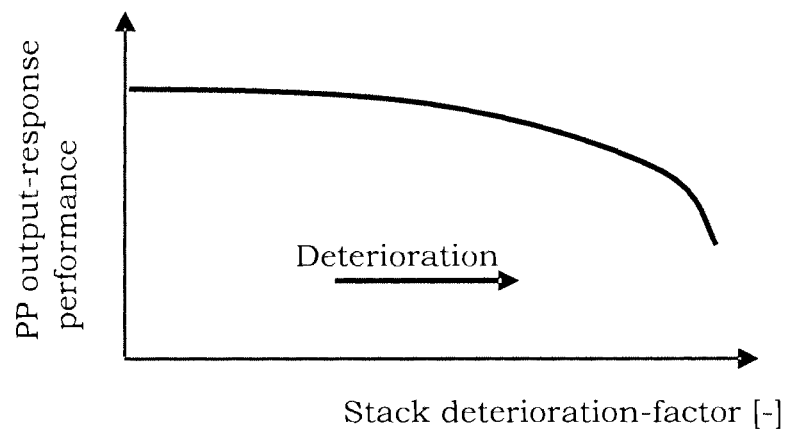
FIG. 16 is an example of a map illustrating a relation between a power-plant output-response request performance and a stack deterioration coefficient.

A second factor may include deterioration of the fuel cell stack 1. As shown in FIG. 15, when the fuel cell stack 1 deteriorates, the stack voltage lowers even at the same magnitude of stack-current. This is because internal resistance is changed with the temporal deterioration. The level of such deterioration is called as a stack deterioration coefficient. As shown in FIG. 16, as the stack deterioration coefficient becomes larger by deterioration of the fuel cell stack 1, the power-plant output-response performance lowers.

Figure 17:
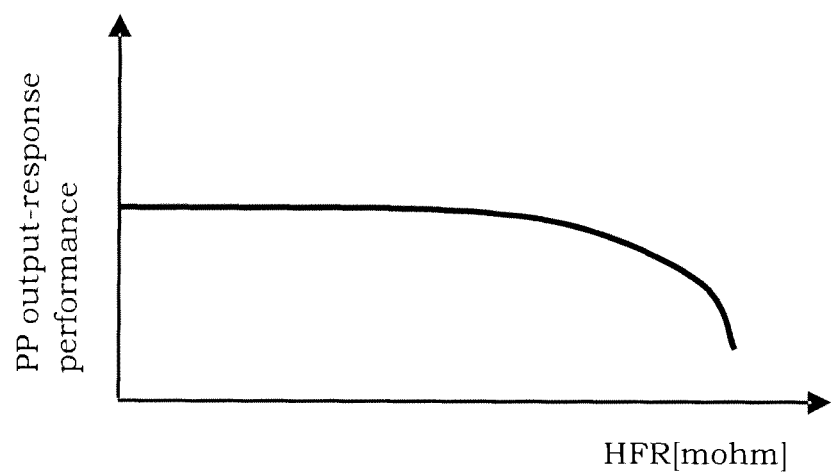
FIG. 17 is an example of a map illustrating a relation between a power-plant output-response request performance and a stack internal resistance.

A third factor may include an internal resistance (HFR) of the fuel cell stack 1. As shown in FIG. 17, the power-plant output-response performance lowers as the HFR becomes larger.

Figure 18:
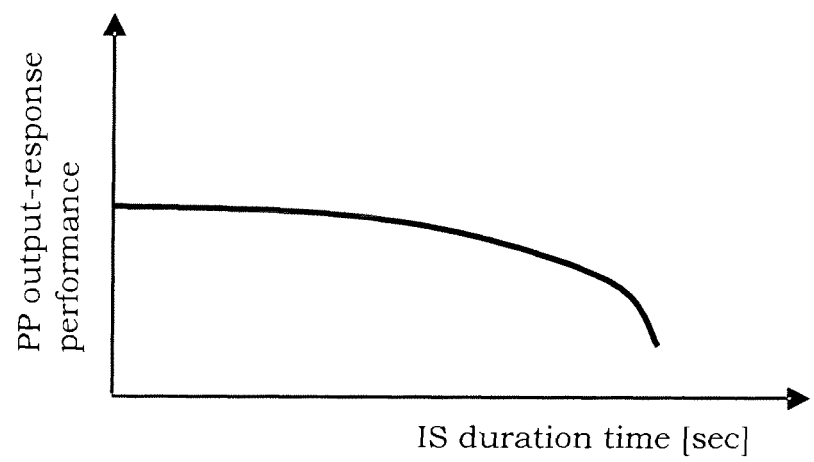
FIG. 18 is an example of a map illustrating a relation between a power-plant output-response request performance and a duration time of idle-stop.

A forth factor may include idle-stop time. During idle-stop, oxygen in the cathode 1B is consumed by reacting with hydrogen that is penetrated into the cathode 1B. Accordingly, as the idle-stop time becomes longer, the nitrogen concentration in the fuel cell stack 1 and flow channels becomes higher. Then, as the nitrogen concentration becomes higher, the response performance of the stack electric power generation lowers when hydrogen and the air are supplied. Therefore, as shown in FIG. 18, as the idle-stop time becomes longer, the power-plant output-response performance lowers.

Figure 19:
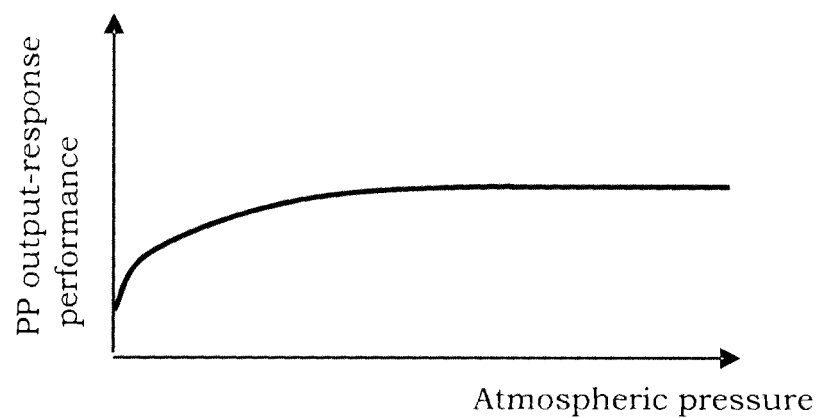
FIG. 19 is an example of a map illustrating a relation between a power-plant output-response request performance and an atmospheric pressure.

On the other hand, the factor that is originated from the others besides the fuel cell stack 1 may include, firstly, the atmospheric pressure. As the atmospheric pressure lowers, the ejection amount of the compressor 21 lowers. Consequently, the output-response performance of the fuel cell stack 1 lowers, so that, as shown in FIG. 19, as the atmospheric pressure is lower, the power-plant output-response performance lowers.

A second factor that is originated from the other than the fuel cell stack 1 may include an output limitation to the power-plant. For example, when a limitation is imposed on an electric power that is allowed to pass through the power manager 5 by overheat of internal elements, an electric power that is supplied from the fuel cell stack 1 or the battery 3 to the electric motor 2 is limited, whereby the power-plant output-response performance lowers. In addition, the same is true for the case that a limitation is imposed on the ejection amount of the compressor 21.

Next, a control routine that is executed by the controller 7 during idle-stop is specifically described.

Figure 13:
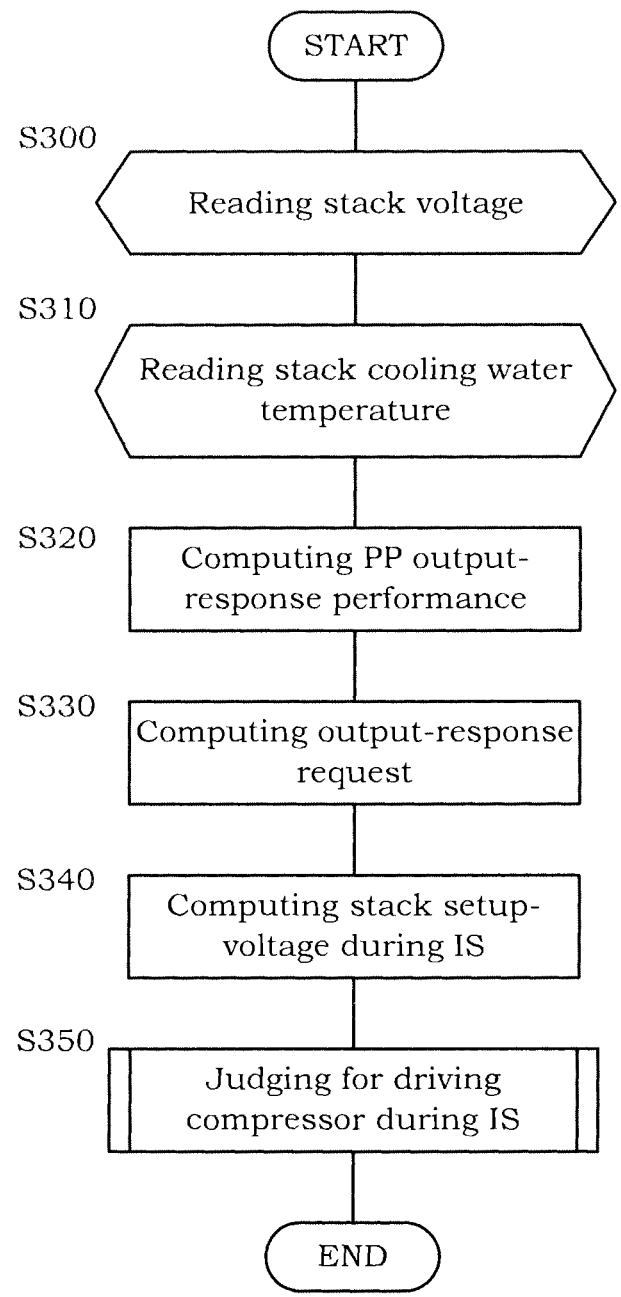
FIG. 13 is a flowchart showing a control routine executed by a controller according to a third embodiment.

FIG. 13 is a flowchart showing a control routine that is in accordance with a first example of the third embodiment and is executed by the controller 7 during idle-stop.

In a step of S300, the controller 7 reads the stack voltage.

In a step of S310, the controller 7 reads the temperature of stack cooling water. The temperature of stack cooling water is detected with a temperature sensor for cooling water, which is not shown in the figures.

In a step of S320, the controller 7 (device adapted to detect an output-response performance of the power plant) computes the power-plant output-response performance. Specifically, a map shown in FIG. 14 is retrieved by using the temperature of stack cooling water that is read in the step of S310. The step of S310 and the step of S320 correspond to a means that detects the power-plant output-response performance.

Figure 20:
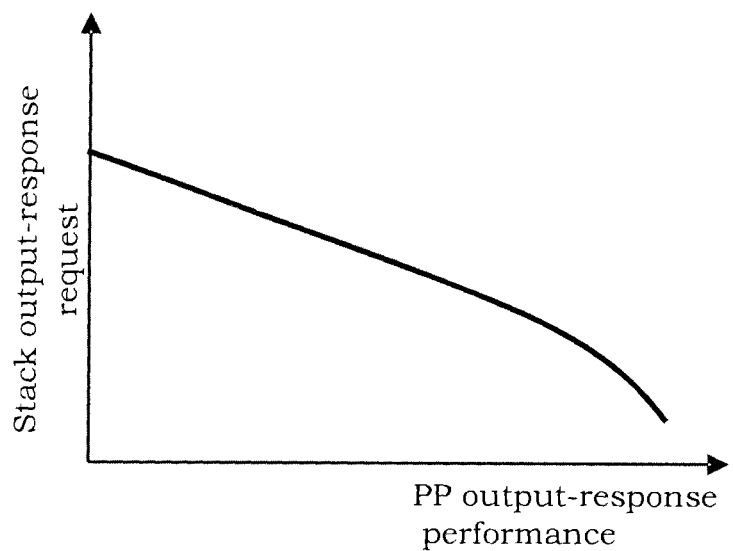
FIG. 20 is an example of a map illustrating a relation between a stack output-response request and a power-plant output-response request performance.

In a step of S330, the controller 7 computes the stack output-response request. Specifically, a map of the stack output-response request shown in FIG. 20 is retrieved by using the power-plant output-response performance that is computed in the step of S320. As shown in FIG. 20, the stack output-response request becomes higher as the power-plant output-response performance is lower.

Each of a step of S340 and a step of S350 is substantially similar to the step of S120 and the step of S130 in FIG. 3 respectively, so that the explanations thereof are omitted.

As shown above, as the power-plant output-response performance is lower, the stack output-response request becomes higher. Consequently, the lower limit of the stack setup-voltage during idle-stop becomes higher. Namely, when the lower limit of the stack setup-voltage during idle-stop is made higher by a lowered amount of the power-plant output-response performance, the response performance of the electric motor 2 to a driver's request can be secured upon recovery from idle-stop.

As a second example of the third embodiment, the stack deterioration coefficient may be computed in the step of S310 in FIG. 13, so that, in the step of S320, a map shown in FIG. 16 may be retrieved by using the stack deterioration coefficient so as to obtain the power-plant output-response performance.

The stack deterioration-factor is computed as follows. At first, a relation between the stack current and the stack voltage of the fuel cell stack 1 at the time of new is memorized as a standard state. On the other hand, the stack current and the stack voltage during electric power generation of the fuel cell stack 1 are read, and then, the difference between the stack voltage in the standard state and the stack voltage that is read most recently is divided by the stack voltage in the standard state. The resulting quotient is used as the stack deterioration coefficient. Note that, the stack deterioration coefficient is not limited to this quotient, but any one that is workable as an index of showing a deterioration level of the fuel cell stack 1 may be used. For example, the stack deterioration coefficient may be set up based on the internal resistance at the time of new and the internal resistance at present.

As a third example of the third embodiment, HFR may be read in the step of S310 in FIG. 13, so that a map shown in FIG. 17 may be retrieved in the step of S320 so as to obtain the power-plant output-response performance.

As the third example of the third embodiment, a duration time of idle-stop is read by the step of S310 in FIG. 13; and then, a map shown in FIG. 18 may be retrieved by the step of S320 so as to obtain the power-plant output-response performance. In this case, the duration time of idle-stop is counted by the controller 7.

As a forth example of the third embodiment, the atmospheric pressure may be read in the step of S310 in FIG. 13, so that, in the step of S320, a map shown in FIG. 19 may be retrieved so as to obtain the power-plant output-response performance. In this case, the atmospheric pressure is detected with an atmospheric pressure sensor that is not shown in the figures.

As a fifth example of the third embodiment, whether an output limitation is imposed or not on the power-plant is judged by the step of S310 in FIG. 13; and then, when the output limitation is imposed, the power-plant output-response request during imposing the output limitation may be set up by the step of S320. In this case, the power-plant output request during the time of output limitation is set up higher as compared with the case of no output limitation.

Also, by way of the second example to the fifth example described above, similarly to the first example, the response performance of the electric motor 2 to a driver's request upon recovery from idle-stop can be secured.

As described above, according to the third embodiment, in addition to the effect similar to the first embodiment, the following effects are further obtained.

The controller 7 computes a higher stack output-response request as the power-plant output-response performance is lower. As a result, a higher lower limit of the stack setup-voltage during idle-stop can be set up so that the stack voltage during idle-stop can be controlled at a higher value. By so doing, even at the time when the power-plant output-response performance lowers, over-discharge of batteries can be avoided in a case including acceleration after recovery from idle-stop.

Fourth Embodiment

The system construction of a fourth embodiment is basically similar to that of the first embodiment. However, a difference from the first embodiment resides in the computation contents of the stack output-response request computed by the controller 7. In this embodiment, the stack output-response request is computed in accordance with the electric power consumption of the accessories 6 (hereinafter, called as accessories electric power consumption). Note that, the controller 7 computes higher the lower limit of the stack setup-voltage during idle-stop, similarly to the first embodiment and the second embodiment, as the stack output-response request is higher.

In the case of acceleration in accordance with a pedaling level of a driver, the output requested for the electric motor 2 is set up in accordance with the accelerator pedaling level, regardless the operating condition of the accessories 6, such as for example, an air conditioner. However, even though the output requested for the electric motor 2 is the same, as the accessories electric power consumption becomes larger, the transient response performance requested for the fuel cell stack 1 becomes larger.

Accordingly, the controller 7 computes a higher stack output-response request as the accessories electric power consumption becomes larger. By so doing, the lower limit of the stack setup-voltage during idle-stop becomes higher as the accessories electric power consumption is larger. As a result, the output-response performance of the fuel cell stack 1 can be secured.

Figure 21:
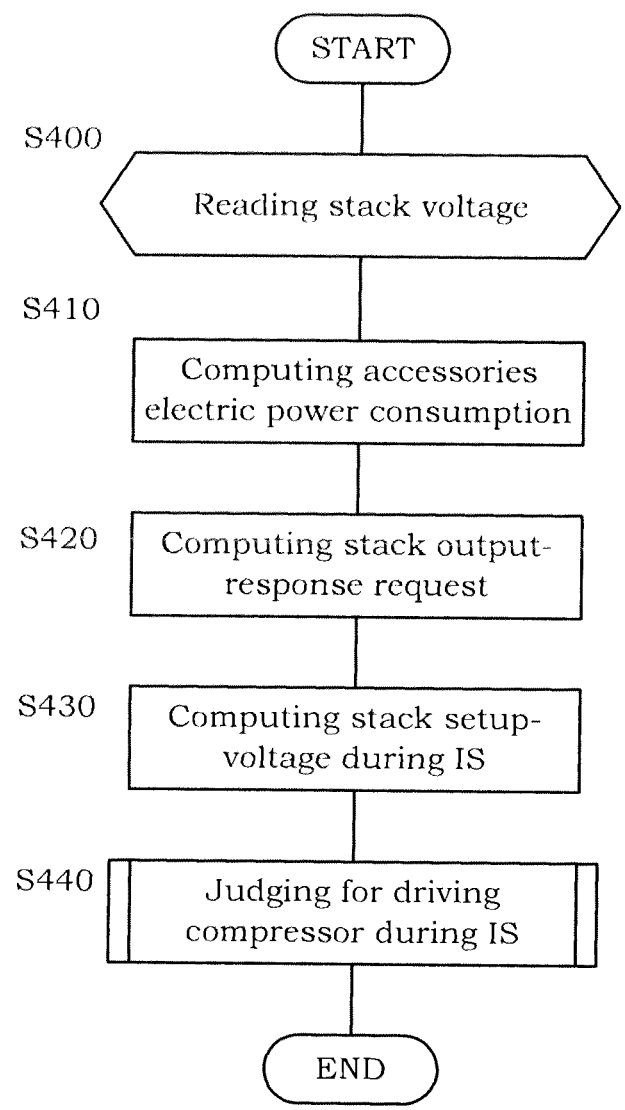
FIG. 21 is a flowchart showing a control routine executed by a controller according to a forth embodiment.

FIG. 21 is a flowchart showing a control routine that is executed by the controller 7 during idle-stop.

In a step of S400, the controller 7 reads the stack voltage.

In a step of S410, the controller 7 (accessories electric power consumption detecting device) computes the accessories electric power consumption. For example, an electric power consumption that is assumed when an air conditioner is operated is preliminary set up based on the specification of the air conditioner. The electric power consumption is used when the air conditioner is switched on. In addition, a surplus electric power is computed from the output electric power of the fuel cell stack 1, the input and output electric power of the battery 3, and the electric power consumptions of the electric motor 2 and the inverter 4, whereby this surplus electric power may be used as the accessories electric power consumption. This step corresponds to a means to detect the accessories electric power consumption.

Figure 22:
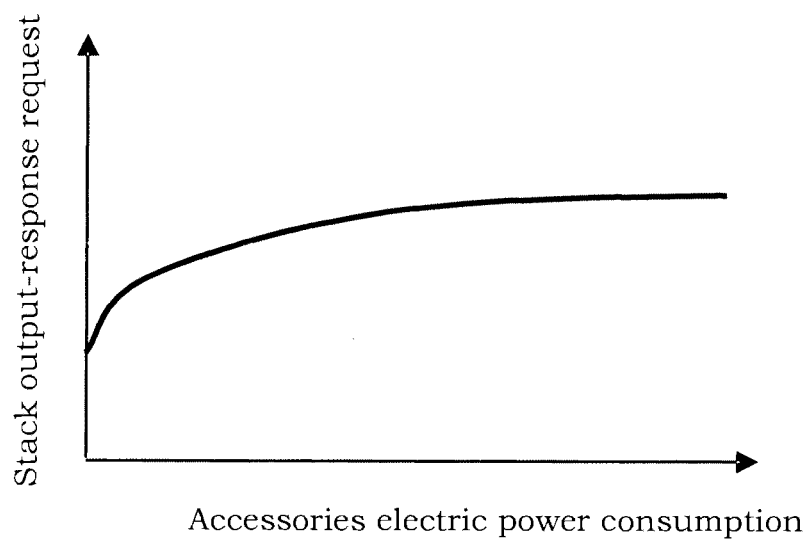
FIG. 22 is an example of a map illustrating a relation between a stack output-response request and accessories electric power consumption.

In a step of S420, the controller 7 computes the stack output-response request by retrieving a map shown in FIG. 22 by using the accessories electric power consumption. FIG. 22 is the map that shows a relation between the accessories electric power consumption and the stack output-response request. As the accessories electric power consumption becomes larger, the stack output-response request becomes higher.

Each of a step of S430 and a step of S440 is substantially similar to the step of S120 and the step of S130 in FIG. 3 respectively, so that the explanations thereof are omitted.

According to this control routine, as the accessories electric power consumption becomes larger, a higher stack output-response request is computed. Consequently, the lower limit of the stack setup-voltage during idle-stop becomes higher. Namely, as the accessories electric power consumption becomes larger, the stack voltage during idle-stop is controlled higher.

By so doing, upon recovery from idle-stop, regardless large or small of the accessories electric power consumption, the stack electric power generation response performance can be secured.

As described above, according to the forth embodiment, in addition to the same effects as the first embodiment, the following effects are further attained.

The controller 7 computes a higher stack output-response request, as the accessories electric power consumption is larger. Upon computing the stack output-response request, when the accessories electric power consumption is taken into consideration, a stack output-response request more closely associated with vehicle conditions is computable. As a result, over-discharge of the battery can be avoided with a higher accuracy during acceleration and so forth after recovery from idle-stop.

The embodiments of the present invention are described above. However, the above embodiments are only a part of the examples of application according to the present invention. The technical scope of the present invention is not meant to be limited within the specific construction of the above embodiments.

The present application claims priority to Japanese Patent Application No. 2011-111267 filed on May 18, 2011, and the entire contents of the said application are incorporated in this specification by reference to it.

The invention claimed is:

1. A control method for a fuel cell system, including a driving unit configured to run a mobile body by supplying an electric power, a fuel cell stack configured to supply an electric power to the driving unit for running, a fuel supply unit configured to supply fuel necessary for electric power generation of the fuel cell stack, comprising:
   computing a stack output-response request, the stack output-response request being an electric power response required from the fuel cell stack to return from an idle-stop;
   setting up a lower limit of a stack setup-voltage during the idle-stop as a stack voltage during execution of the idle-stop that becomes higher as the stack output-response request becomes larger and becomes lower as the stack output-response request becomes smaller; and
   executing a recovery operation in which the fuel or air is supplied when an actual voltage of the fuel cell stack becomes lower than the lower limit of the stack setup-voltage during the idle-stop.

2. A fuel cell system, comprising:
   a driving unit configured to run a mobile body by supplying an electric power;
   a fuel cell stack configured to supply an electric power to the driving unit for running;
   a fuel supply unit configured to supply fuel necessary for electric power generation of the fuel cell stack; and
   a controller configured to control a power-plant comprising the fuel cell stack and the fuel supply unit,
   wherein,
   the controller comprises:
      a stack output-response request computing unit programmed to compute a stack output-response request, the stack output-response request being an electric power response required from the fuel cell stack to return from an idle-stop;
      a stack voltage setup unit programmed to set up, during the idle-stop, a lower limit of a stack setup-voltage during the idle-stop that is set up as a stack voltage during execution of the idle-stop that becomes higher as the stack output-response request becomes larger and becomes lower as the stack output-response request becomes smaller; and
      an operation unit of recovering a stack voltage during the idle-stop programmed to execute a recovery operation in which the fuel or air is supplied when an actual voltage of the fuel cell stack becomes lower than the lower limit of the stack setup-voltage during the idle-stop.

3. The fuel cell system according to claim 2, further comprising:
   a vehicle speed detecting device configured to detect a vehicle speed,
   wherein,
   the stack output-response request computing unit is programmed to compute a stack output-response request that becomes higher as the vehicle speed becomes higher.

4. The fuel cell system according to claim 2, further comprising:
   a battery's dischargeable output electric power detecting device configured to detect a battery's dischargeable output electric power,
   wherein,
   the stack output-response request computing unit is programmed to compute a stack output-response request that becomes higher as the battery's dischargeable output electric power becomes lower.

5. The fuel cell system according to claim 2, further comprising:
   a device configured to detect an output-response performance of the power-plant,
   wherein,
   the stack output-response request computing unit is programmed to compute a stack output-response request that becomes higher as the output-response performance of the power-plant becomes lower.

6. The fuel cell system according to claim 2, further comprising:
   an accessories electric power consumption detecting device adapted to detect an electric power consumed by accessories,
   wherein,
   the stack output-response request computing unit is programmed to compute a stack output-response request that becomes higher as the accessories electric power consumption becomes larger.

7. A fuel cell system, comprising:
   a driving unit configured to run a mobile body by supplying an electric power;
   a fuel cell stack configured to supply an electric power to the driving unit for running;
   a fuel supply unit configured to supply fuel necessary for electric power generation of the fuel cell stack; and stack output-response request computing means for computing a stack output-response request, the stack output-response request being an electric power response required from the fuel cell stack to return from an idle-stop;

stack voltage setup means for setting up, during the idle-stop, a lower limit of a stack setup-voltage during the idle-stop that is set up as a stack voltage during execution of the idle-stop that becomes higher as the stack output-response request becomes larger and becomes lower as the stack output-response request becomes smaller; and operation means of recovering a stack voltage during idle-stop for executing a recovery operation in which the fuel or air is supplied when an actual voltage of the fuel cell stack becomes lower than the lower limit of the stack setup-voltage during the idle-stop.

* * * * *